(12) United States Patent
Wang et al.

(10) Patent No.: US 8,934,785 B2
(45) Date of Patent: Jan. 13, 2015

(54) LASER DRIVER PEAKING SYSTEM AND METHOD FOR OPTICAL COMMUNICATION SYSTEMS

(71) Applicant: Avago Technologies General IP (Singapore) Pte. Ltd., Singapore (SG)

(72) Inventors: Xiaozhong Wang, Cupertino, CA (US); David Chak Wang Hui, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 223 days.

(21) Appl. No.: 13/623,569

(22) Filed: Sep. 20, 2012

(65) Prior Publication Data

US 2014/0079410 A1    Mar. 20, 2014

(51) Int. Cl.
*H04B 10/50* (2013.01)
*H04B 10/516* (2013.01)
*H04B 10/524* (2013.01)

(52) U.S. Cl.
USPC .......................................... 398/183; 398/189

(58) Field of Classification Search
CPC . H04B 10/504; H04B 10/5167; H04B 10/503
See application file for complete search history.

(56) References Cited

U.S. PATENT DOCUMENTS

| | | | |
|---|---|---|---|
| 6,373,346 B1 | 4/2002 | Kobayashi et al. | |
| 6,480,067 B1 | 11/2002 | Kobayashi et al. | |
| 7,577,364 B2 | 8/2009 | Edwards et al. | |
| 7,684,452 B1 | 3/2010 | Draper et al. | |
| 2005/0175355 A1* | 8/2005 | Hauenschild et al. | 398/161 |
| 2005/0265474 A1* | 12/2005 | Chandrasekhar et al. | 375/291 |
| 2011/0211846 A1* | 9/2011 | Lindsay et al. | 398/194 |

OTHER PUBLICATIONS

Maxim Integrated Products, "3.2 Gbps Compact SFP VCSEL Driver" datasheet, 2002.

* cited by examiner

*Primary Examiner* — Leslie Pascal

(57) ABSTRACT

In an optical data communication system transmitter, in which a laser is driven with a laser modulation signal in response to a serial data stream, the laser driver adds peaking to a bit other than the first bit following a bit transition.

20 Claims, 9 Drawing Sheets

LASER DRIVER PEAKING SYSTEM AND METHOD FOR OPTICAL COMMUNICATION SYSTEMS

BACKGROUND

A serial data communication system includes a transmitter, a receiver, and a communication link or channel coupling the transmitter and receiver. The physical medium of the communication link is commonly either copper wire or optical fiber. In some types of communication systems, a data signal is sent on one channel, while a clock signal is sent on another channel in synchronism with the data signal. In other types of communication systems, only one channel is used. In this latter type of system, the transmitter sends the data signal on a channel without an accompanying clock signal. The receiver generates a clock signal from an approximate frequency reference and then detects the data stream by phase-aligning the generated clock signal to transitions in the data signal and sampling the data signal. Such a communication system is commonly referred to as a Clock and Data Recovery (CDR) system.

In CDR and similar communication systems, the quality of the received signal and thus the ability to recover the data at the receiver is often impaired by inter-symbol interference (ISI), crosstalk, echo, and other noise. In addition, impairments in the receiver itself may further degrade the quality of the received signal.

A technique known as peaking or pre-emphasis can be employed in a transmitter to enhance received signal quality and thereby enhance data recovery in an optical receiver. Peaking briefly boosts the output power of the transmitter and then returns the output power to a nominal level. For example, it is known that boosting or peaking transmitter power immediately following a signal level transition from a "0" bit to a "1" bit and, similarly, immediately following a transition representing a transition from a "1" bit to a "0" bit can enhance data recovery. In each instance, only the bit immediately following the transition is peaked.

In recent years, electrical data communication systems, in which an electrical signal transmitter and electrical signal receiver are coupled by a copper wire medium, have given way to optical data communication systems, in which an optical transmitter and optical receiver are coupled by an optical fiber. In optical data communication systems, the optical transmitter is commonly a laser, and the optical receiver is commonly a photodiode. The above-described peaking techniques have been carried over from electrical data communication systems to the newer optical data communication systems. Accordingly, it is known to boost laser power (e.g., by the laser driver circuitry adding a momentary peaking current) immediately following a bit transition.

The received signal can be represented by a graphical construct known as a "data eye," "eye diagram," or "eye pattern." An eye diagram is a superposition of a number of impaired individual signals with varying frequency components (e.g., due to ISI and noise) over a unit interval (UI) of the data signal (i.e., the shortest time period over which the data signal can change state). As the various impairments increase, the quality of an eye diagram derived from or otherwise detected by observation of the received signal is impaired.

An eye diagram may be generated by applying the data signal to the vertical input of an oscilloscope or similar test instrument and triggering a horizontal sweep across the unit interval based on the data rate of the data signal. When the data signal corresponds to a pseudorandom data signal, the superposed samples appear on the oscilloscope display as an eye diagram with an eye opening bounded by two transition regions. Various features of the eye opening reveal information about the quality of the communication channel over which the serial data signal is transmitted. For example, a wide eye opening indicates that the data signal has a relatively low noise level and a relatively low bit-error rate, whereas a narrow eye opening indicates that the data signal has a relatively high noise level and a relatively high bit-error rate. It is known that the eye opening can be increased by employing the above-described peaking technique.

As illustrated in FIG. 1, it is known that a laser driven in a conventional manner (and without any added peaking) exhibits a natural or inherent peaking on the first bit after a bit transition, as a result of the laser's inherent self-relaxation oscillation. In FIG. 1, such natural or inherent peaking can be observed in a region 10 immediately following a bit transition from a "0" (low laser optical power) to a "1" (high laser optical power). That is, in region 10 the laser optical power briefly increases above a nominal power level 12 corresponding to a "1" before returning to the nominal power level 12 for the duration of the time the laser produces an output corresponding to a "1" bit. Similarly, natural or inherent peaking can be observed in a region 14 immediately following a bit transition from a "1" (high laser optical power) to a "0" (low laser optical power). That is, in region 14 the laser optical power briefly decreases below a nominal power level 16 corresponding to a "1" before returning to the nominal power level 16 for the duration of the time the laser produces an output corresponding to a "0".

The desire for economical, high-throughput, low power, optical data communication systems has led to the use of multi-mode optical fiber and vertical cavity surface-emitting lasers (VCSELs). Considerations relating to semiconductor physics and manufacturing reliability impose a practical limit on VCSEL bandwidth. It would be desirable to facilitate increased data rates in such systems by enhancing received signal quality through means other than increased VCSEL bandwidth.

SUMMARY

Embodiments of the present invention relate to a system and method for an optical data communication system transmitter, in which a laser is driven with a laser modulation signal in response to a serial data stream and in which peaking is added to a bit other than the first bit following a bit transition.

In an exemplary embodiment, a method includes producing a laser modulation signal in response to the serial data stream, producing a peaking signal in response to a bit transition in the serial data stream, delaying the peaking signal by a delay time corresponding to at least one bit in the serial data stream to produce a delayed peaking signal, increasing the laser modulation signal by an amount corresponding to the delayed peaking signal, and providing the laser modulation signal to a data signal input of the laser.

In an exemplary embodiment, a laser driver circuit comprises laser modulator circuitry configured to produce a laser modulation signal in response to the serial data stream, delay circuitry configured to produce a delayed peaking signal in response to a bit transition in the serial data stream, and combiner circuitry configured to increase the laser modulation signal by an amount corresponding to the delayed peaking signal. The delay circuitry delays the peaking signal from the bit transition by a delay time corresponding to at least one bit in the serial data stream.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 2:
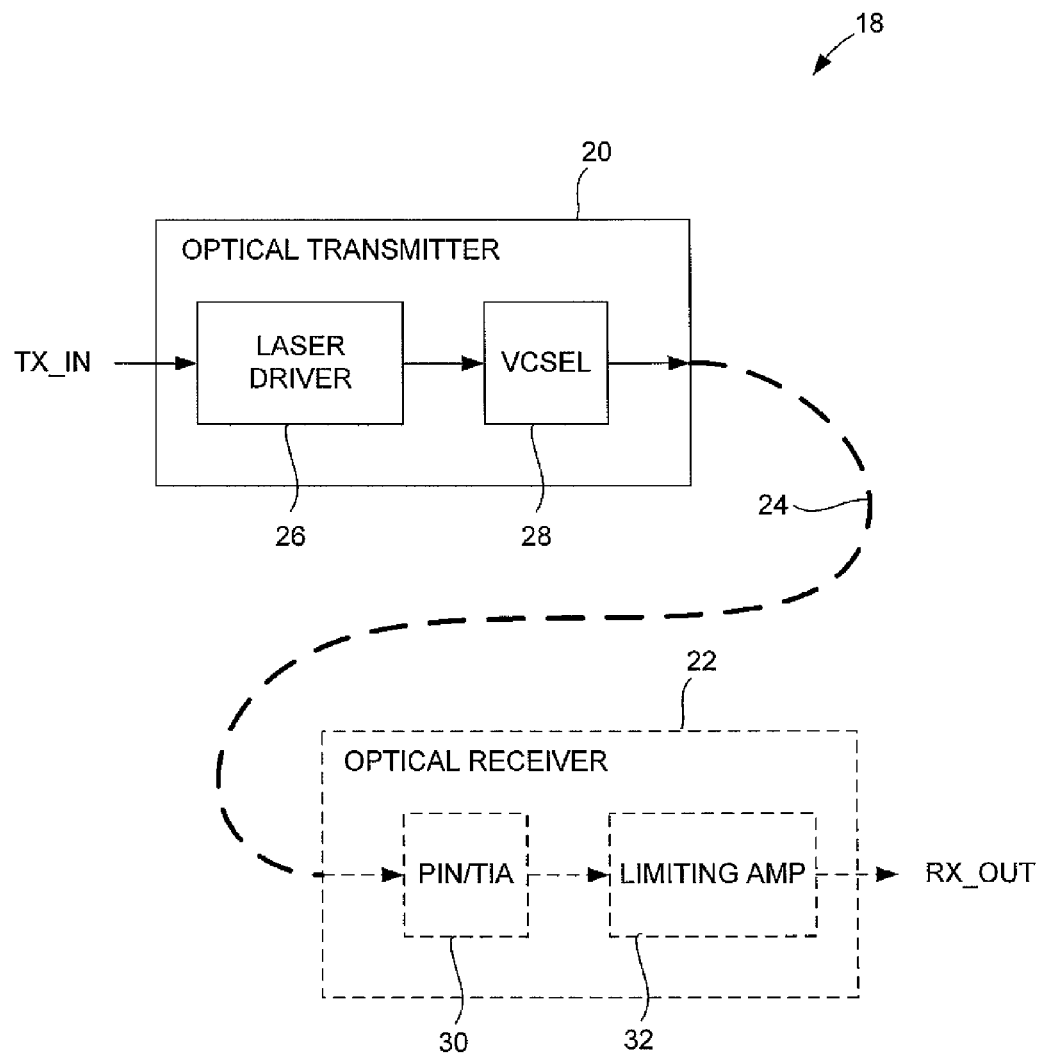
FIG. 2 is a block diagram of an optical data communication system having an optical transmitter in accordance with the present invention.

As illustrated in FIG. 2, in an illustrative or exemplary embodiment of the invention, an optical data communication system 18 includes an optical transmitter 20, an optical receiver 22, and an optical fiber 24 coupling the optical transmitter 20 and optical receiver 22. Optical transmitter 20 includes a laser driver 26 and a laser, such as a vertical cavity surface-emitting laser (VCSEL) 28. Optical receiver 22 includes a photodiode 30, such as a positive-intrinsic-negative (PIN) photodiode (which can include an associated trans-impedance amplifier (TIA)), and a limiting amplifier 32. A data stream or serial sequence of data bits is input to optical transmitter 20 in the form of electrical signals (TX_IN). In response to the data stream, optical transmitter 20 converts the electrical signals to corresponding optical signals, and couples the optical signals onto optical fiber 24. Optical fiber 24 conveys the optical signals to optical receiver 22, which converts the optical signals to electrical signals. Limiting amplifier 32 and associated circuitry in optical receiver 22 recovers the data, i.e., produces an electrical signal (RX_OUT) representing a determination whether a bit is a "1" or a "0". In FIG. 2, optical receiver 22 and optical fiber 24 are shown in broken line to indicate these elements are peripheral to the disclosure herein. That is, the disclosure relates primarily to optical transmitter 20. Optical receiver 22 can be of any suitable conventional type and is therefore not described herein in further detail.

Figure 1:
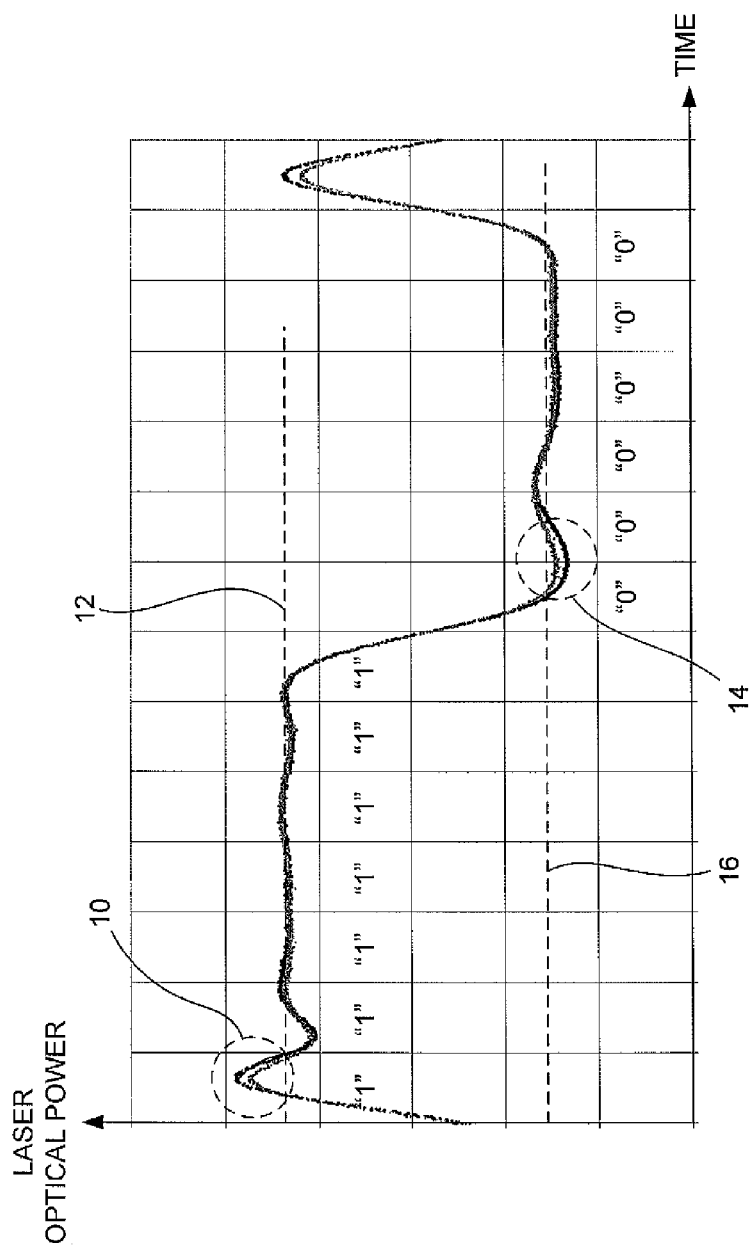
FIG. 1 is a waveform plot illustrating operation of a laser in response to bit transitions, in accordance with the prior art.

Limiting amplifier 32 or related circuitry of optical receiver 22 commonly includes a Bessel-Thompson filter (not separately shown in FIG. 2 for purposes of clarity) or similar filter. The purpose of this filter is to remove high-frequency noise from the photodiode output signal that can impair data recovery (i.e., impair the determination of whether a bit is a "1" or a "0"). At the relatively low data rates that have been common until recently, the Bessel-Thompson filter also removed the above-described (FIG. 1) natural or inherent peaking that occurs in the first data bit following a bit transition as a result of VCSEL relaxation oscillation. As noted above, in accordance with the prior art, it was observed that employing conventional peaking techniques enhanced data recovery. As practitioners in the art designed optical communication systems to operate at ever-higher data rates, they increased the Bessel-Thompson filter cut-off frequency to keep pace with the data rate, i.e., to remove signals in a frequency range that is sufficiently high relative to the data rate to be considered noise.

In accordance with the present disclosure, the inventors have recognized that at today's high data rates, a Bessel-Thompson filter or similar filter that is appropriate for the data rate has such a high cut-off frequency that it no longer removes VCSEL relaxation oscillation frequencies and have recognized that the VCSEL exhibits inherent or natural peaking in the first data bit following a bit transition. Significantly, the inventors have further recognized that employing conventional peaking techniques, in which peaking is added to the first data bit following a bit transition, can actually impair data recovery at high data rates, as evidenced by a narrowing of the data eye.

Figure 3:
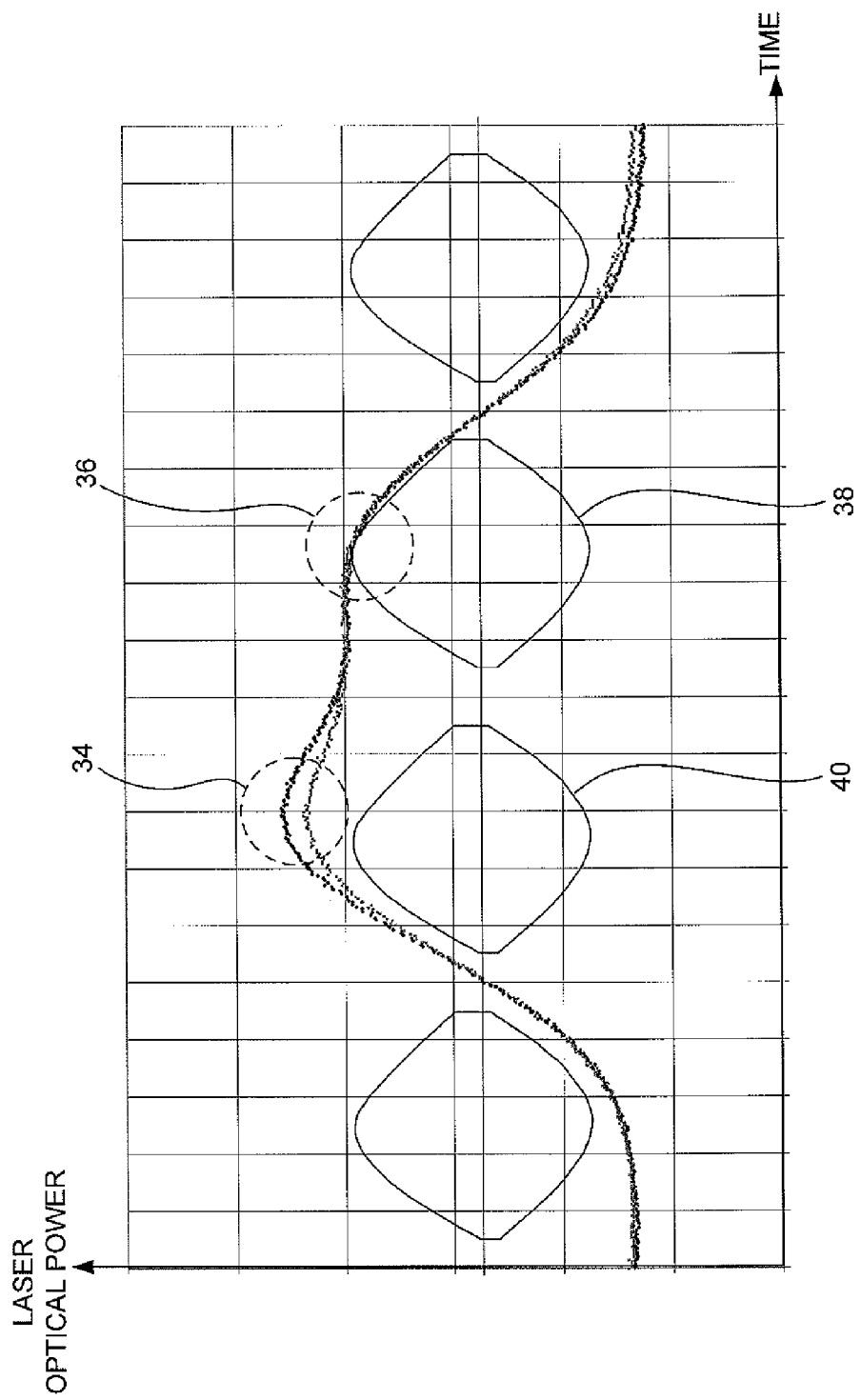
FIG. 3 is a timing diagram illustrating an exemplary instance of operation of the laser driver of FIG. 2.

As illustrated in FIG. 3, at a high data rate, such as, for example, 16 Gbits/s, a VCSEL output signal exhibits inherent or natural peaking in a region 34 immediately following a first bit transition from a "0" (low laser optical power) to a "1" (high laser optical power) due to the VCSEL's relaxation oscillation. But more significantly, the VCSEL relaxation oscillation adversely affects the next or second bit period (UI) following the (first) bit period in which this first bit transition occurs. More specifically, the VCSEL relaxation oscillation manifests itself in a narrowing of the data eye associated with the region 36. Note in region 36 that there is less space between the VCSEL output signal and the reference region 38 than there is between the VCSEL output signal and a correspondingly located reference region 40 in the preceding bit period. (Reference regions 38, 40, etc., are identical in shape (i.e., approximating the shape of a data eye) and spaced along the time axis at intervals of one UI.)

In accordance with the above, circuitry can be provided in laser driver 18 (FIG. 2) that adds peaking to a bit in the data stream that is delayed by at least one bit period (UI) from a bit transition. That is, the peaking is added to the second or a subsequent (i.e., third, fourth, etc.) bit in the data stream following the (first) bit in which the bit transition occurred. Peaking is not added to the first bit following the bit transition.

Figure 4:
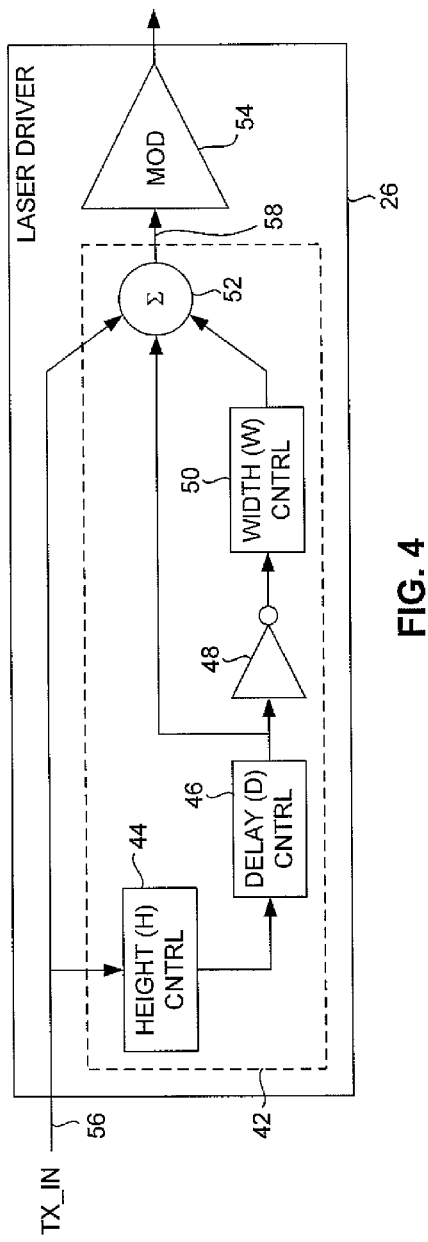
FIG. 4 is a block diagram of the laser driver of FIG. 2.

As illustrated in FIG. 4, in an exemplary embodiment the peaking circuitry 42 in laser driver 26 can include height control circuitry 44, delay control circuitry 46, an inverter 48, width control circuitry 50, and summing circuitry 52. The output of peaking circuitry 42 is provided as an input to conventional laser modulation circuitry 54. Laser modulation circuitry 54 drives VCSEL 28 (FIG. 2) by biasing VCSEL 28 and supplying current that modulates the output of VCSEL 28, as well known in the art. Laser modulation circuitry 54 can be of any suitable conventional type and is therefore not described in further detail herein.

Height control circuitry 44 can comprise an amplifier circuit, such that the output signal of height control circuitry 44 follows the input signal but is of greater amplitude. Height control circuitry 44 determines the amplitude or height (H) of the peaking to be added to the data bit. The amplitude or height can be a fixed value or, as described below, a user-selectable value.

The output of height control circuitry 44 is provided as an input signal to delay control circuitry 46. Delay control circuitry 46 can comprise a delay line, such that the output of delay control circuitry 46 is a delayed version of the input signal. Delay control circuitry 46 determines the point in time, relative to the point at which the bit transition occurs, at which the peaking to be added to the transmitter input signal (TX_IN) occurs. Thus, for example, in an instance in which delay control circuitry 46 adds a delay of one bit period (UI), the peaking is added to the second data bit (i.e., the data bit following the (first) data bit at which the bit transition occurred). The delay (D) can be a fixed value or, as described below, a user-selectable value. The delay can be an integer multiple of one bit period or any other value. Thus, delay control circuitry 46 can determine at what point in time within a single bit period the peaking is to be added. For example, in instances in which the delay is not an integer multiple of the bit period, delay control circuitry 46 can cause the peaking to occur at the beginning of the second bit period or, alternatively, closer to the middle of the second bit period. The output of delay control circuitry 46 is provided to summing circuitry 52 and inverter 48.

The output of inverter 48 is provided as an input signal to width control circuitry 50. Width control circuitry 50 can comprise another delay line. Width control circuitry 50 controls the width or duration of the peaking (pulse) to be added to the data bit. The value of the delay and thus the width (W) of the peaking pulse can be a fixed value or, as described below, a user-selectable value.

Summing circuitry 52 adds the outputs of delay control circuitry 46 and width control circuitry 50 to the original transmitter input signal (TX_IN). Although in the exemplary embodiment the transmitter input signal is combined with the peaking signals through a summation or additive operation performed by summing circuitry 52, in other embodiments (not shown) these signals can be combined through other types of combining operations performed by other types of combining circuitry.

Figure 5:
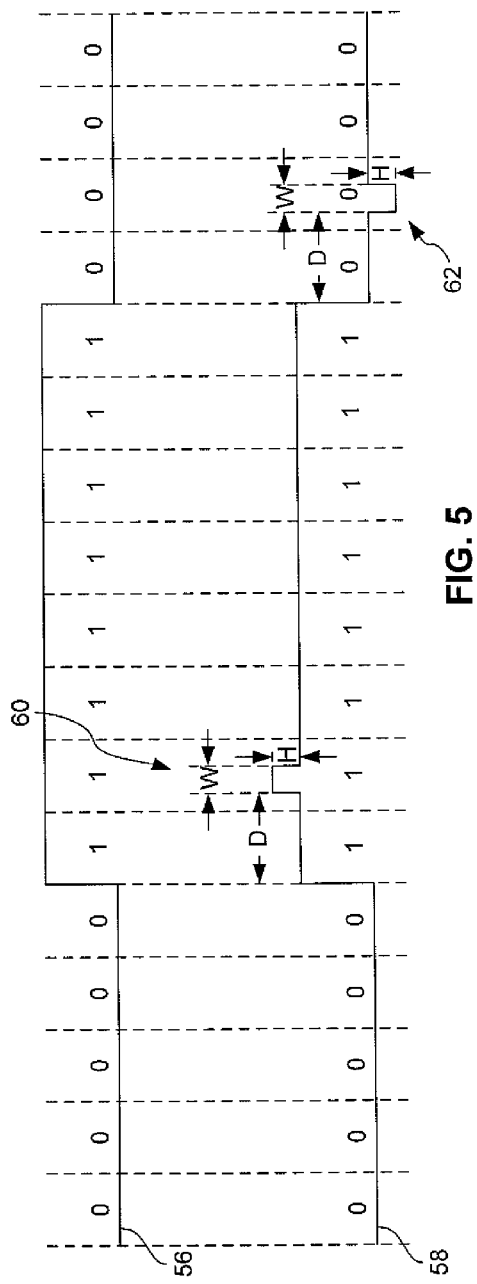
FIG. 5 is a timing diagram illustrating an exemplary instance of operation of the laser driver of FIG. 4.

As illustrated in FIG. 5, in operation, when an exemplary transmitter input signal 56 (TX_IN) is input to the above-described peaking circuitry 42, peaking circuitry 42 produces a peaked output signal 58 in response. Note that the peaking 60 that peaking circuitry 42 adds to the exemplary transmitter input signal 56 is characterized by a pulse-shaped region beginning at a point in time that is delayed by an amount of time (D) following the bit transition that is greater than one bit period (unit interval). That is, peaking 60 is added to a bit other than the first bit following the bit transition. The peaking is further characterized by a height (H) above the nominal "1" signal level (or, conversely, below the nominal "0" signal level), and a width (W). Note that in the embodiment illustrated in FIGS. 4-5 the peaking 60 that is added to the nominal "1" signal level is the same as (i.e., the same values of D, H and W) the peaking 62 that is subtracted from the nominal "0" signal level.

Figure 6:
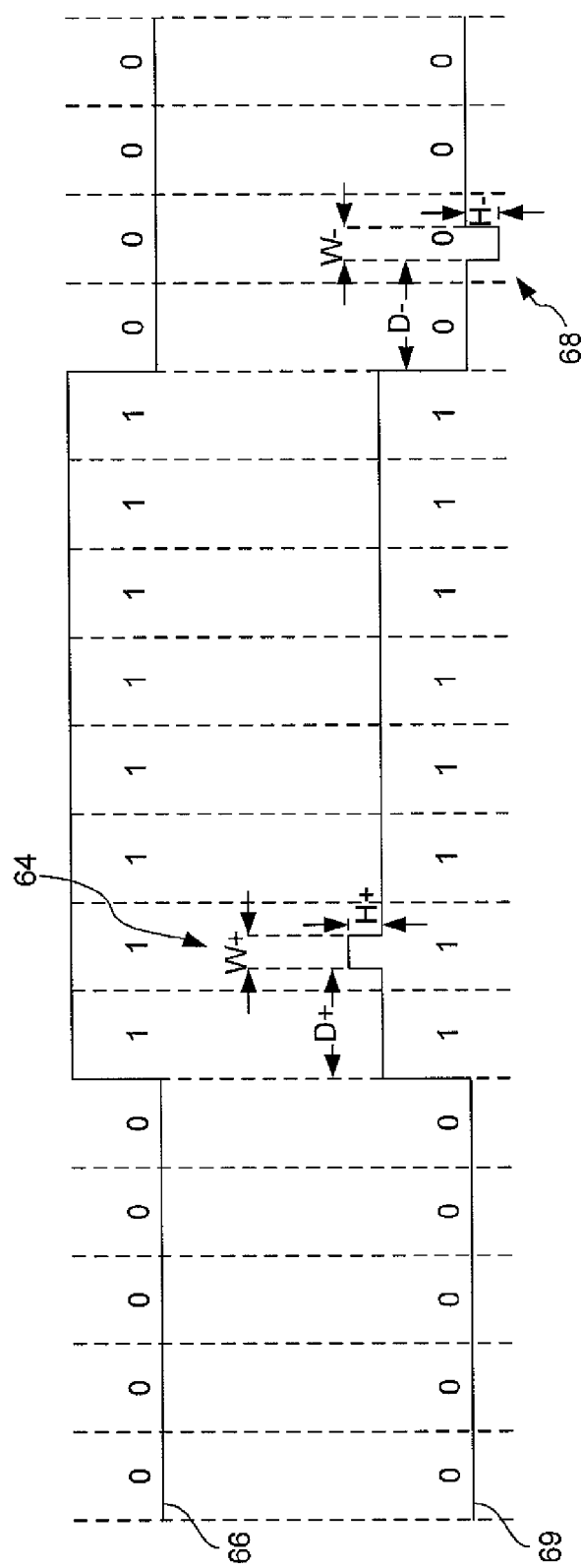
FIG. 6 is a timing diagram illustrating an exemplary instance of operation of another exemplary laser driver.

As illustrated in FIG. 6, in another embodiment the peaking 64 that is added to the nominal "1" signal level of an exemplary transmitter input signal 66 (TX_IN) can be different from the peaking 68 that is subtracted from the nominal "0" signal level of exemplary transmitter input signal 66. That is, peaking 64 can be characterized by a combination of values of delay (D+), height (H+), and width (W+), while peaking 68 can be characterized by a different combination of values of delay (D−), height (H−), and width (W−). The peaked output signal 69 can be produced by the circuitry 70 described below with regard to FIG. 7.

Figure 7:
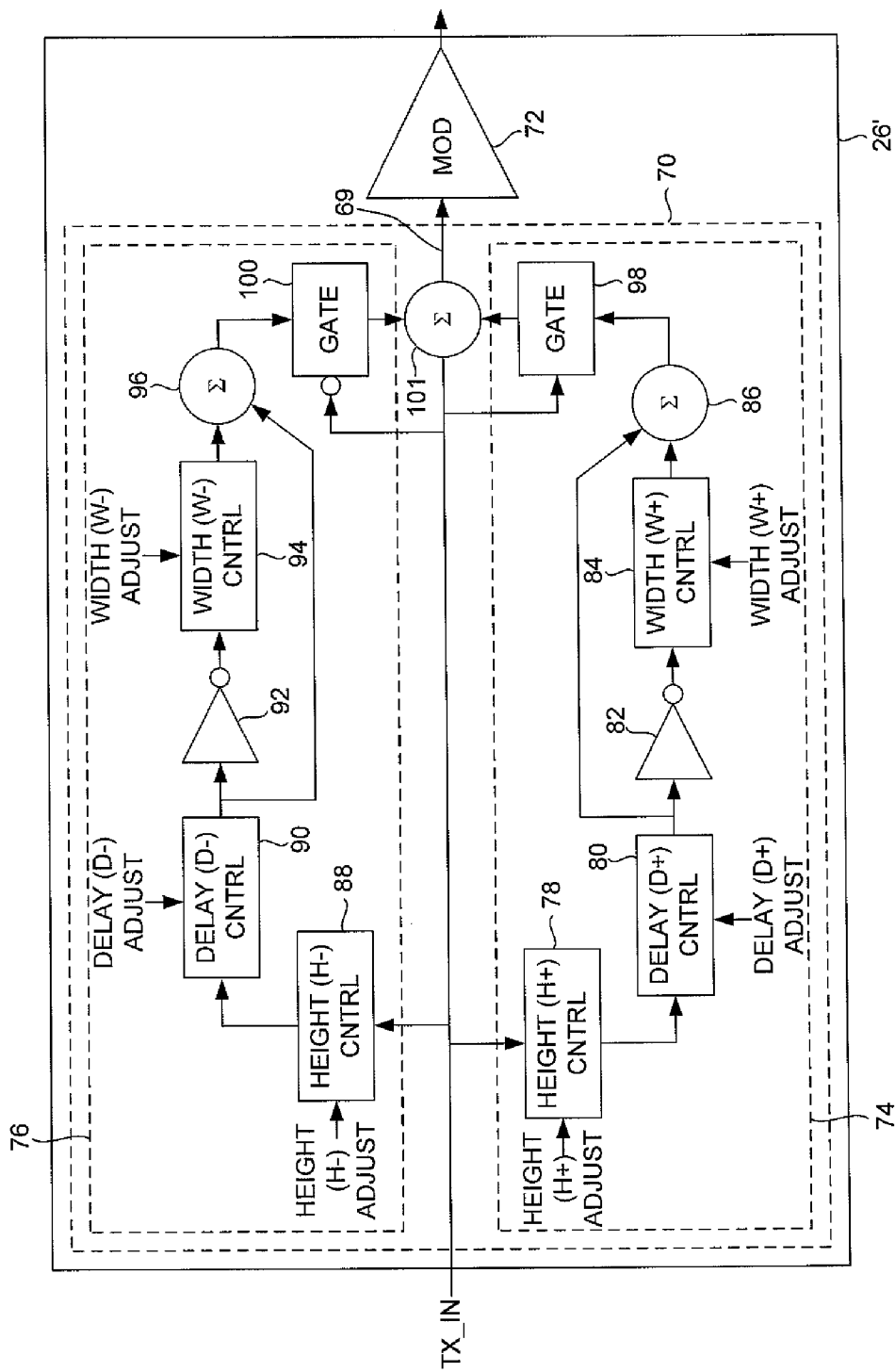
FIG. 7 is a block diagram illustrating another exemplary laser driver.

As illustrated in FIG. 7, exemplary peaking circuitry 70 can be used instead of the above-described peaking circuitry 42 to provide a result such as that shown in FIG. 6, in which the peaking applied to a "1" bit (or positive data signal) is different from the peaking applied to a "0" bit (or negative data signal). As in the above-described embodiment, the output of peaking circuitry 70 is provided as an input to conventional laser modulation circuitry 72. In this embodiment, the combination of peaking circuitry 70 and laser modulation circuitry 72 defines a laser driver 26', which, except as described below, is similar to above-described laser driver 26.

Peaking circuitry 70 can include positive data signal peaking circuitry 74 and negative data signal peaking circuitry 76. Positive data signal peaking circuitry 74 includes height control circuitry 78, delay control circuitry 80, an inverter 82, width control circuitry 84, and summing circuitry 86, all of which operate in the same manner described above with regard to corresponding elements of peaking circuitry 42 (FIG. 4) with the exception that they are user-adjustable. That is, the values of D+, H+ and W+ can be selected or set by a user at the time of manufacture or, alternatively, in the field. Negative data signal peaking circuitry 76 includes height control circuitry 88, delay control circuitry 90, an inverter 92, width control circuitry 94, and summing circuitry 96, all of which operate in the same manner described above with regard to peaking circuitry 42 (FIG. 4) with the exception that they are user-adjustable. That is, the values of D−, H− and W− can be selected by a user at the time of manufacture or, alternatively, in the field. Positive data signal peaking circuitry 74 further includes gating circuitry 98 (e.g., an AND gate) that passes the transmitter input signal when it is positive (i.e., has a nominal signal level corresponding to a "1") and inhibits the transmitter input signal when it is negative (i.e., has a nominal signal level corresponding to a "0"). Similarly, negative data signal peaking circuitry 76 further includes gating circuitry 100 (e.g., an AND gate) that passes the transmitter input signal when it is negative (i.e., has a nominal signal level corresponding to a "0") and inhibits the transmitter input signal when it is positive (i.e., has a nominal signal level corresponding to a "1"). Peaking circuitry 70 further includes final summing circuitry 101 that adds the outputs of gating circuitry 98 and gating circuitry 100 to the transmitter input signal (TX_IN).

Figure 8:
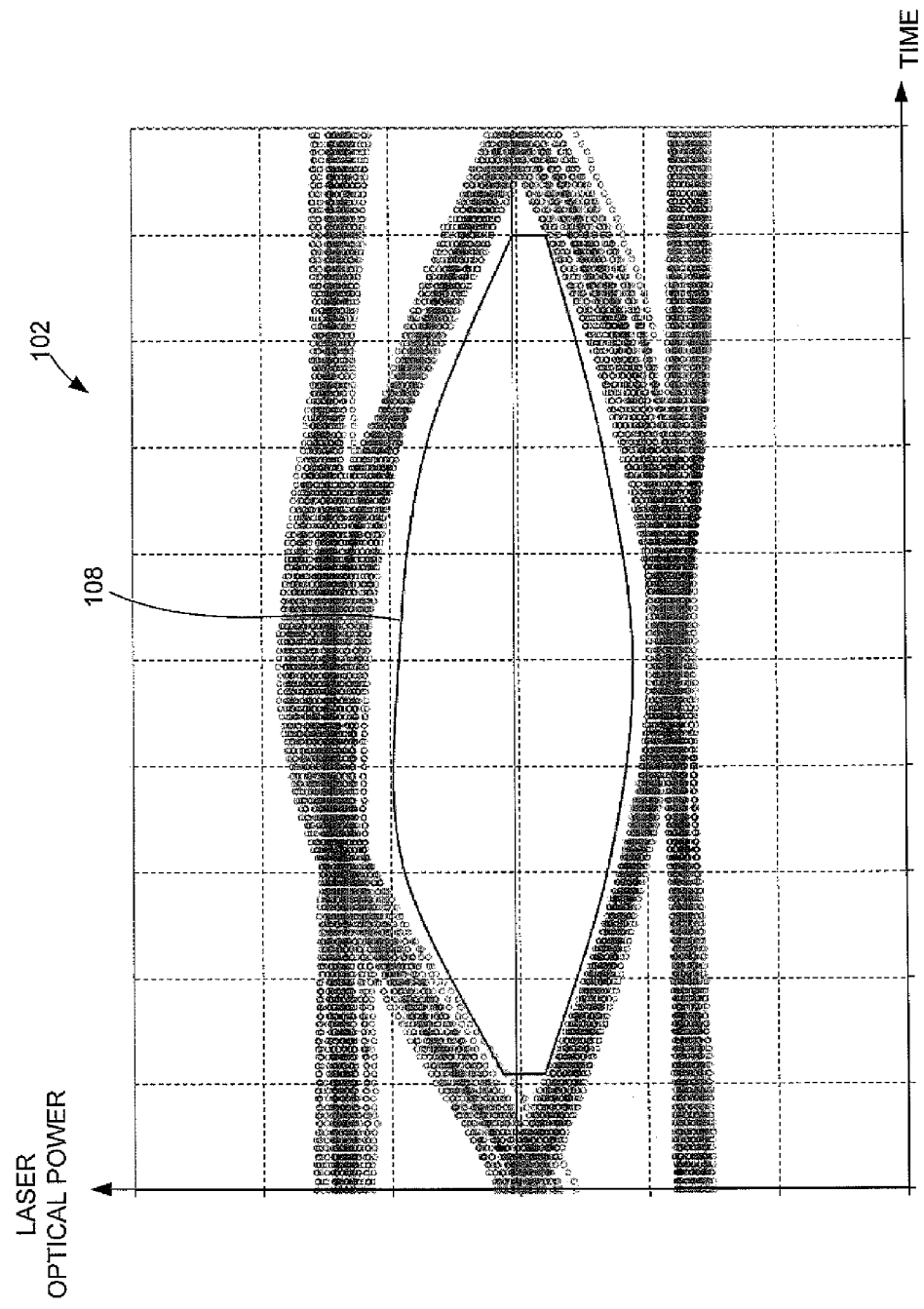
FIG. 8 is an eye diagram illustrating an exemplary instance of operation of a laser, in accordance with an exemplary embodiment of the invention.
Figure 9:
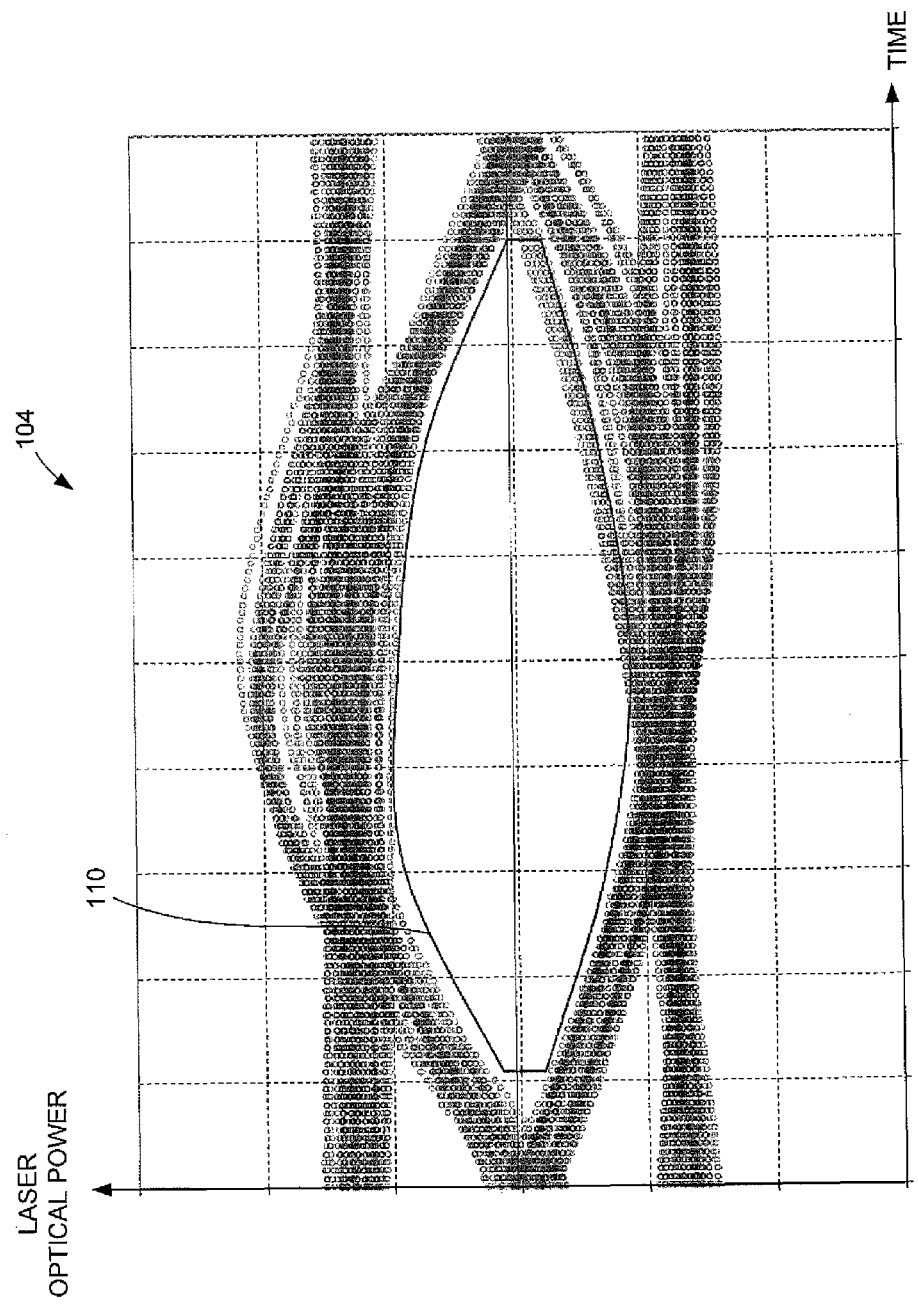
FIG. 9 is an eye diagram illustrating another exemplary instance of operation of a laser in an optical communication system.
Figure 10:
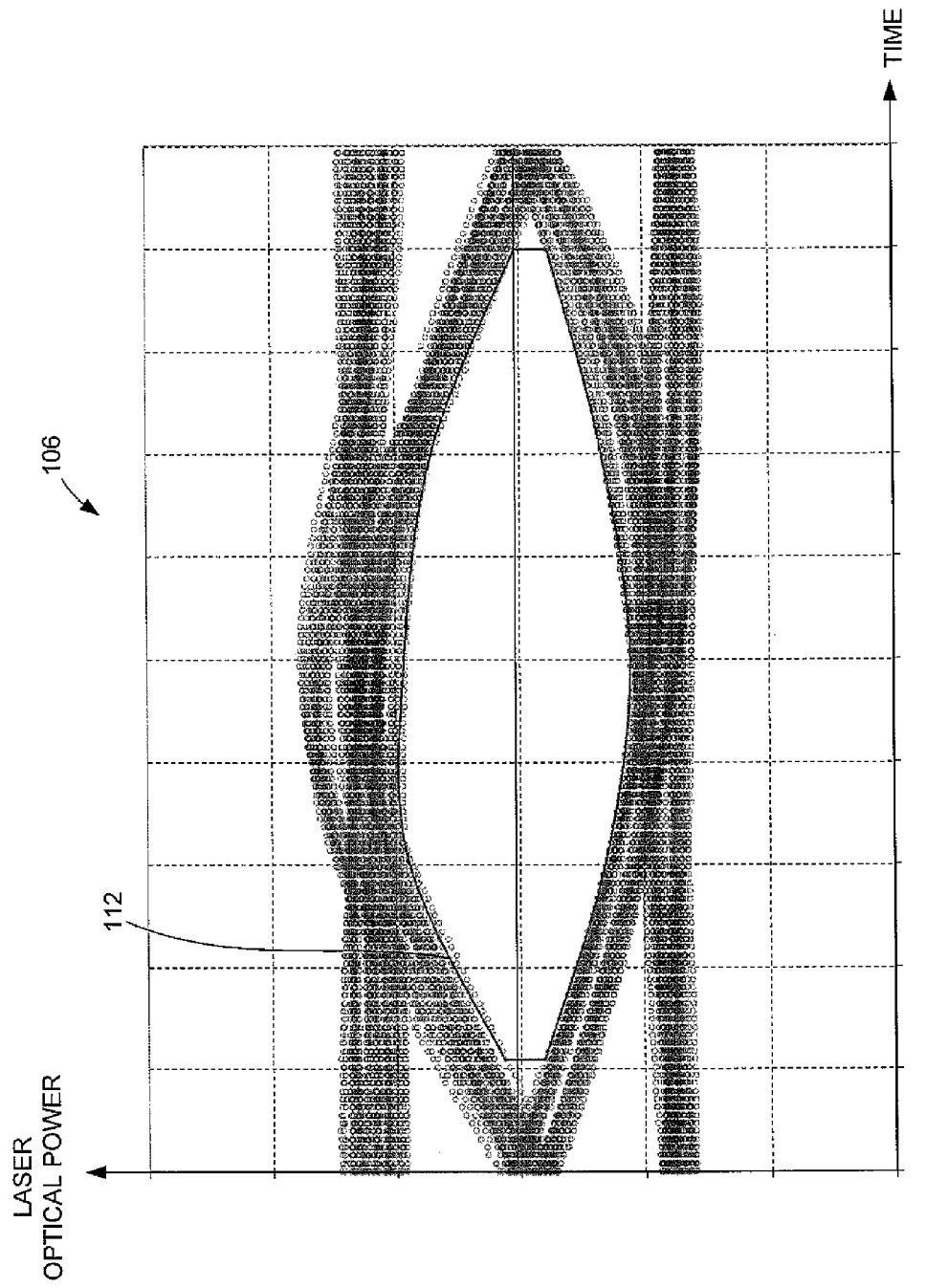
FIG. 10 is an eye diagram illustrating still another exemplary instance of operation of a laser in an optical communication system.

As illustrated in FIG. 8, a first exemplary eye diagram 102 represents the VCSEL output in an instance in which peaking is added to the ("second") bit in the data stream following the ("first") bit in which a bit transition occurred, but no peaking is added to the first bit or any other bit. As illustrated in FIG. 9, a second exemplary eye diagram 104 represents the VCSEL output in an instance in which peaking is added to the first bit in the data stream but no peaking is added to the second bit or any other bit. Such an instance of operation can result from the operation of circuitry (not shown) similar to that shown in FIG. 4 or 7 but in which the delay (D) is less than one bit period (unit interval). As illustrated in FIG. 10, a third exemplary eye diagram 106 represents the VCSEL output in an instance in which no peaking is added to any bit. Such an instance of operation can result from the operation of circuitry (not shown) similar to that shown in FIG. 4 or 7 but in which peaking circuitry 42 and 70 are omitted.

It can be seen in the first exemplary eye diagram 102 (FIG. 8) that there is more space, i.e., the eye is more open, between the VCSEL output and the reference region 108 than there is between the VCSEL output and the reference region 110 in the second exemplary eye diagram 104 and between the VCSEL output and the reference region 112 in the third exemplary eye diagram 106 (where reference regions 108, 110 and 112 are identical to each other, and the scale and other characteristics of eye diagrams 102, 104 and 106 are also identical to each other). In exemplary eye diagram 104 (FIG. 9), where peaking is applied at the first bit after a transition in addition to the natural VCSEL peaking, excessive overshoot is observed in the VCSEL output waveform. The excessive peaking also has the side effect of causing the VCSEL output to cross over to reference region 110, resulting in eye opening degradation. Thus, peaking the second bit while not peaking the first bit enhances data recovery to a greater extent than peaking the first bit. Peaking bits subsequent to the second bit while not peaking the first bit can similarly enhance data signal recovery. Selecting which bits to peak (i.e., the first, second, third, nth, etc.) can be performed readily by empirical testing and observation of the resulting eye diagram. For example, values of D, H and W can be varied with respect to each other while observing the effect on the resulting eye diagram until the eye opening is maximized. The optimal values of D, H and W (i.e., the values that result in the maximum eye opening) may depend upon the characteristics of the VCSEL, the data speed, or other factors.

One or more illustrative embodiments of the invention have been described above. However, it is to be understood that the invention is defined by the appended claims and is not limited to the specific embodiments described.

What is claimed is:

1. A method for driving a laser in an optical data communication system transmitter in response to a serial data stream, the method comprising:
   producing a laser modulation signal in response to the serial data stream, the laser modulation signal having a first signal level in response to a "0" bit in the serial data stream and a second signal level in response to a "1" bit in the serial data stream;
   producing a peaking signal in response to a bit transition in the serial data stream;
   delaying the peaking signal by a delay time corresponding to at least one bit in the serial data stream after the bit transition to produce a delayed peaking signal, the delayed peaking signal having a positive polarity in response to the bit transition being from a "0" to a "1" and a negative polarity in response to the bit transition being from a "1" to a "0";
   increasing an amplitude of the laser modulation signal by an amount corresponding to the delayed peaking signal having the positive polarity when the serial data stream represents a "1" bit and not increasing the amplitude of the laser modulation signal by the amount corresponding to the delayed peaking signal having the positive polarity when the serial data stream represents a "0" bit;
   increasing an amplitude of the laser modulation signal by an amount corresponding to the delayed peaking signal having the negative polarity when the serial data stream represents a "0" bit and not increasing the amplitude of the laser modulation signal by the amount corresponding to the delayed peaking signal having the negative polarity when the serial data stream represents a "1" bit; and
   providing the laser modulation signal to a data signal input of the laser.

2. The method of claim 1, wherein delaying the peaking signal by a delay time corresponding to at least one bit in the serial data stream comprises delaying the peaking signal until a beginning of a second bit following a first bit at the bit transition.

3. The method of claim 1, wherein delaying the peaking signal by a delay time corresponding to at least one bit in the serial data stream comprises receiving a user-selectable input representing the delay time.

4. The method of claim 1, wherein producing a peaking signal in response to a bit transition in the serial data stream comprises receiving a user-selectable input representing a peaking amplitude.

5. The method of claim 1, wherein producing a peaking signal in response to a bit transition in the serial data stream comprises receiving a user-selectable input representing a peaking width.

6. The method of claim 1, wherein producing a peaking signal in response to a bit transition in the serial data stream comprises producing a first peaking signal having a first characteristic in response to a bit transition from a "0" to a "1" and producing a second peaking signal having a second characteristic in response to a bit transition from a "1" to a "0".

7. The method of claim 6, wherein the first characteristic is a first peaking delay time and the second characteristic is a second peaking delay time.

8. The method of claim 6, wherein the first characteristic is a first peaking amplitude and the second characteristic is a second peaking amplitude.

9. The method of claim 6, wherein the first characteristic is a first peaking width and the second characteristic is a second peaking width.

10. A laser driver circuit for driving a laser in an optical data communication system transmitter in response to a serial data stream, comprising:
   laser modulator circuitry configured to produce a laser modulation signal in response to the serial data stream, the laser modulation signal having a first signal level in response to a "0" bit in the serial data stream and a second signal level in response to a "1" bit in the serial data stream;
   delay circuitry configured to produce a delayed peaking signal in response to a bit transition in the serial data stream, the delayed peaking signal delayed from the bit transition by a delay time corresponding to at least one bit in the serial data stream, the delayed peaking signal having a positive polarity in response to the bit transition being from a "0" to a "1" and a negative polarity in response to the bit transition being from a "1" to a "0"; and
   combiner circuitry configured to increase an amplitude of the laser modulation signal by an amount corresponding to the delayed peaking signal, the combiner circuitry including gating circuitry configured to increase an amplitude of the laser modulation signal by an amount corresponding to the delayed peaking signal having the positive polarity when the serial data stream represents a "1" bit and to not increase the amplitude of the laser modulation signal by the amount corresponding to the delayed peaking signal having the positive polarity when the serial data stream represents a "0" bit and to configured to increase the amplitude of the laser modulation signal by an amount corresponding to the delayed peaking signal having the negative polarity when the serial data stream represents a "0" bit and to not increase the amplitude of the laser modulation signal by the amount corresponding to the delayed peaking signal having the negative polarity when the serial data stream represents a "1" bit.

11. The laser driver circuit of claim 10, wherein the delay circuitry produces the delayed peaking signal at a beginning of a second bit following a first bit at the bit transition.

12. The laser driver circuit of claim 10, wherein the delay circuitry comprises a peaking delay control for receiving a user-selectable input representing the delay time.

13. The laser driver circuit of claim 10, wherein the delay circuitry comprises a peaking height control for receiving a user-selectable input representing a peaking amplitude.

14. The laser driver circuit of claim 10, wherein the delay circuitry comprises a peaking width control for receiving a user-selectable input representing a peaking width.

15. The laser driver circuit of claim 10, wherein the delay circuitry comprises:
first delay circuitry configured to produce a first delayed peaking signal having a first amplitude in response to a bit transition from a "0" to a "1"; and
second delay circuitry configured to produce a second delayed peaking signal having a second amplitude in response to a bit transition from a "1" to a "0".

16. The laser driver circuit of claim 15, wherein:
the combiner circuitry comprises first combiner circuitry configured to increase the amplitude of the laser modulation signal by an amount corresponding to the first delayed peaking signal and second combiner circuitry configured to increase the amplitude of the laser modulation signal by an amount corresponding to the second delayed peaking signal;
the first delay circuitry comprises a first peaking delay control for receiving a user-selectable input representing a first delay time, a first peaking height control for receiving a user-selectable input representing a first peaking amplitude, and a first peaking width control for receiving a user-selectable input representing a first peaking width; and
the second delay circuitry comprises a second peaking delay control for receiving a user-selectable input representing a second delay time, a second peaking height control for receiving a user-selectable input representing a second peaking amplitude, and a second peaking width control for receiving a user-selectable input representing a second peaking width.

17. The laser driver circuit of claim 16, wherein:
the first combiner circuitry comprises first summing circuitry configured to sum an output of the first peaking delay control and an output of the first peaking width control;
the second combiner circuitry comprises second summing circuitry configured to sum an output of the second peaking delay control and an output of the second peaking width control; and
the combiner circuitry further comprises third summing circuitry operable in response to an output of the first summing circuitry and an output of the second summing circuitry.

18. The laser driver circuit of claim 10, wherein the combiner circuitry is configured to sum the delayed peaking signal and the serial data stream.

19. A laser driver circuit for driving a laser in an optical data communication system transmitter in response to a serial data stream, comprising:
laser modulator circuitry configured to produce a laser modulation signal in response to the serial data stream, the laser modulation signal having a first signal level in response to a "0" bit in the serial data stream and a second signal level in response to a "1" bit in the serial data stream;
positive data signal peaking circuitry operable in response to the serial data stream, the positive data signal peaking circuitry comprising positive data signal control circuitry;
negative data signal peaking circuitry operable in response to the serial data stream, the negative data signal peaking circuitry comprising negative data signal control circuitry;
summing circuitry configured to sum portions of the serial data stream representing a "1" bit and an output of the positive data signal peaking circuitry and configured to sum portions of the serial data stream representing a "0" bit and an output of the negative data signal peaking circuitry; and
gating circuitry operable in response to bit values of the serial data stream and configured to gate the output of the positive data signal peaking circuitry into a first input of the summing circuitry and configured to gate an output of the negative data signal peaking circuitry into a second input of the summing circuitry.

20. The laser driver circuit of claim 19, wherein
the positive data signal peaking circuitry comprises first peaking delay control circuitry, first peaking height control circuitry, first peaking width control circuitry, first summing circuitry operable in response to an output of the first peaking delay control circuitry and an output of the first peaking width control circuitry, and positive data signal gating circuitry configured to pass portions of the serial data stream representing a "1" bit and inhibit portions of the serial data stream representing a "0" bit; and
the negative data signal peaking circuitry comprises second peaking delay control circuitry, second peaking height control circuitry, second peaking width control circuitry, second summing circuitry operable in response to an output of the second peaking delay control circuitry and an output of the second peaking width control circuitry, and negative data signal gating circuitry configured to pass portions of the serial data stream representing a "0" bit and inhibit portions of the serial data stream representing a "1" bit.

* * * * *